Nov. 14, 1950 — M. L. McBRAYER ET AL — 2,529,846
ZERO SUPPRESSION SYSTEM FOR ELECTRONIC
MOISTURE REGISTER INSTRUMENTS
Filed Feb. 24, 1948
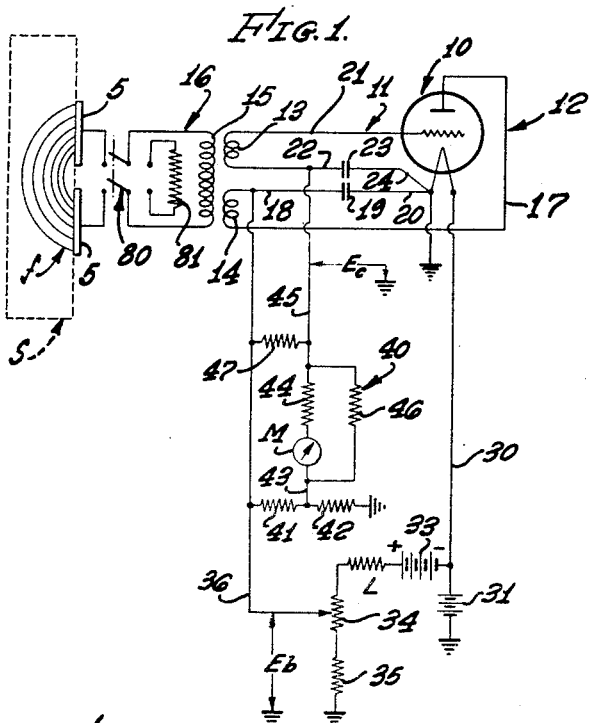
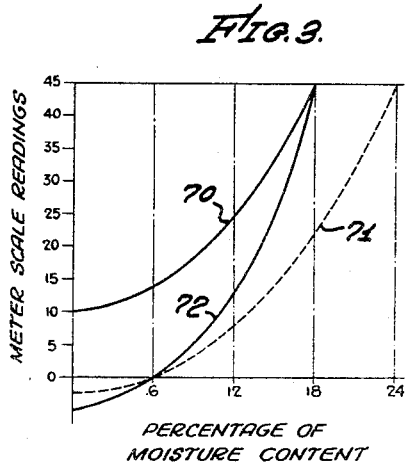
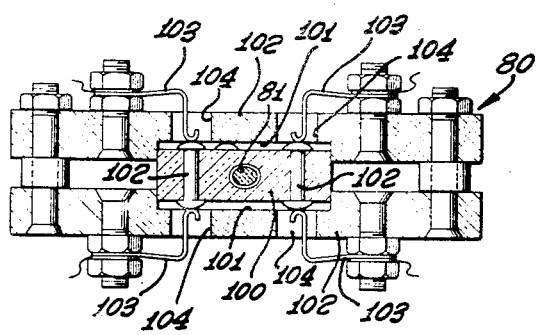
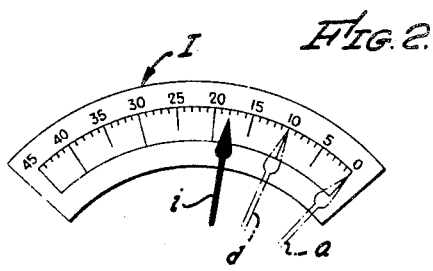
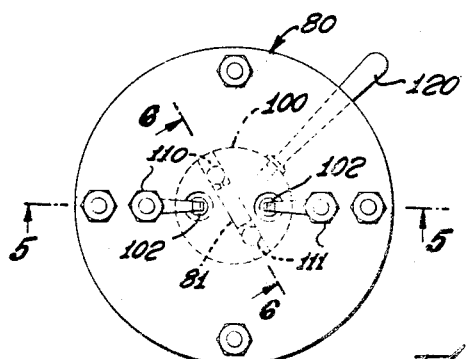
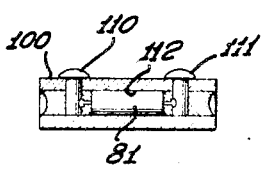
MARVIN L. McBRAYER,
AUGUST JOHN SWYKE,
INVENTORS.
BY Forrest J. Lilly
ATTORNEY.

UNITED STATES PATENT OFFICE 2,529,846

ZERO SUPPRESSION SYSTEM FOR ELECTRONIC MOISTURE REGISTER INSTRUMENTS

Marvin L. McBrayer, Alhambra, and August John Swyke, Arcadia, Calif., assignors to Moisture Register Company, Alhambra, Calif., a corporation of California Application February 24, 1948, Serial No. 10,436

2 Claims. (Cl. 175—183)

This invention deals with electronic instruments for measuring or otherwise responding to moisture content of materials such as lumber, paper, and textiles, and granular products such as grain, flour, etc.

The invention deals more particularly with improvements in a type of instrument disclosed in United States Patent No. 2,231,035 to Robert L. Stevens and James P. Dallas, entitled Power Absorption Metering System. However, while the present invention is preferably applied in connection with the electric circuit disclosed in said patent, no implied limitation thereto is intended, as the invention has wider application as will become evident.

Briefly, the circuit of the aforesaid patent comprises a high frequency oscillator to whose plate and grid coils is coupled a power output circuit leading to a pair of electrodes adapted to be placed adjacent a sample of the material to be tested. The electric field between these electrodes is caused to penetrate the sample, which absorbs power from the oscillator in an amount varying with the percentage of moisture present in the sample. The oscillator is so designed that the current in its grid circuit falls with increasing power absorption, and hence furnishes a measure of the power being absorbed by the sample, and therefore of the amount of moisture present therein.

A calibration curve may be prepared with percentage of moisture content as abscissa, and readings of a microammeter in the grid circuit as ordinates. Knowing from standard laboratory tests (e. g., drying oven and weighing) the actual percentages of moisture in a given sample of material for a series of microammeter readings, the scale of the microammeter may either be calibrated directly in percentages of moisture, or be marked off in arbitrary scale divisions and charts prepared showing the percentage of moisture for different materials corresponding to the divisions of the arbitrary scale adopted. The latter procedure is the usual one.

The above procedure is suitable for the calibration of a laboratory instrument, but not for the calibration of instruments manufactured in numbers, since the calibration as described is too time-consuming. For the latter purpose, each instrument after assembly is checked against previously prepared standards, and its circuit adjusted by means of a network of resistors until its microammeter reads accurately for each of a series of standards of progressively increasing power absorption characteristics. These standards may be blocks of material of varying power absorption characteristics. For example, there may be used a series of plastic blocks having incorporated therein, in progressively increasing proportions, some substance such as carbon having power loss or absorption characteristics. Or samples of the actual material to be tested can be used if humidity-controlled to predetermined percentages of moisture content. It has been the practice to employ air as the first standard in such a series, and to adjust a voltage divider in the instrument to bring the microammeter to a "zero" indication with the electrodes in contact with air alone. This "zero" adjustment on air is re-made on the occasion of each use of the instrument, and has the effect of adjusting the instrument for the entire scale of the microammeter. This practice however has the disadvantage that the zero point on the scale of the microammeter corresponds to a reading on air, which is substantially below the scale reading for zero moisture content in the material, it being explained that a sample of bone dry wood, for example, will give some reading owing to presence of factors other than moisture. Thus the zero moisture percentage point for the material to be tested may be up the scale a substantial distance from the actual beginning end of the scale, meaning a compression of the active or usable part of the scale. Moreover, the most interesting part of the scale is sometimes a region well above zero percent moisture, as for instance, from six percent upwards. Evidently, the scale range from 6% upwards may be very considerably compressed if the scale starts with a reading on air. The maximum scale reading of the instrument might be, for example, one corresponding to 18% moisture. The complete useful range of the instrument, 6% to 18%, may thus be compressed into about two-thirds of its available operating range.

The primary object of the invention is accordingly the provision of a system whereby the beginning or minimum point of any selected moisture range of interest may be set to correspond with an extreme end or zero position of the microammeter scale.

The invention may be better understood by now referring to the following detailed description of a present preferred embodiment thereof, reference being directed to the accompanying drawings, in which:

Figure 1 shows diagrammatically a preferred type of circuit incorporating the improvements of the present invention;

Figure 2 shows a meter scale;
Figure 3 shows a set of calibration curves;
Figure 4 is a plan view of a switch; and
Figures 5 and 6 are sections on lines 5—5 and 6—6, respectively, of Figure 4.

The drawing shows a high frequency vacuum tube oscillator of the same general type as disclosed in the aforementioned patent number 2,231,035. This oscillator includes oscillator tube 10 (typically a 1LE3), having grid and plate circuits 11 and 12 coupled by grid and plate circuit coils 13 and 14, respectively, to which is coupled coil 15 of output circuit 16.

Plate circuit 12 includes lead 17 connecting the plate of tube 10 to coil 14, lead 18 connecting coil 14 to by-pass condenser 19, and lead 20 connecting the latter to the grounded side of the filament of tube 10.

Grid circuit 11 includes lead 21 connecting the grid to coil 13, lead 22 connecting coil 13 to by-pass condenser 23, and lead 24 connecting the latter to the grounded side of the filament of tube 10.

The positive terminal of the filament is connected by lead 30 to the positive terminal of filament battery 31, the negative terminal of which is ground as indicated. Lead 30 is also connected to the negative terminal of 15 volt B or plate battery 33, the positive terminal of which is connected through fixed limit resistor L (e. g., 2400 ohms), adjustable voltage divider resistor 34 (e. g., 3000 ohms), and fixed resistor 35 (e. g., 10,000 ohms) to ground. The variable tap of voltage divider resistor 34 is connected by lead 36 to plate circuit lead 18. It should be evident that the voltage applied to the plate of tube 10 is that between circuit lead 36 and ground, as indicated at $E_b$. The voltage applied to the plate is under the control of voltage divider 34, and is usually maintained at 12 volts.

Positive grid bias voltage for the tube 10 is obtained from plate battery 33 through a resistor network generally indicated by the numeral 40 leading to a connection with the grid circuit between condenser 23 and coil 13. Thus, a resistor 41 is connected at one end to plate circuit lead 36, and at its other end to one end of a resistor 42, the other end of which is connected to ground. Without setting any limitations on the invention, these resistors 41 and 42 may be of the order of 18,000 ohms and 1600 ohms, respectively. A lead 43 is connected between resistors 41 and 42, and this lead 43 goes to microammeter M and series resistor 44, the latter being, for instance, of a resistance of the order of 680 ohms. The microammeter itself may have a resistance of say 660 ohms. The other end of resistor 44 is connected by lead 45 to grid circuit lead 22. Microammeter M and resistor 44 are preferably shunted by resistor 46 of the order of 1300 ohms. Finally, a resistor 47, of the order of one megohm, is connected between the plate lead 36 and lead 45, at a point between resistors 44 and 46 and the grid circuit lead 22. It should be evident that a positive grid bias voltage $E_c$ will be developed between lead 45 and ground, and will be applied to the grid of the tube; also, that this voltage is controlled proportionately to $E_b$ by voltage divider 34.

The output coil 15 of the oscillator is connected in output circuit 16 leading to output electrodes 5. These electrodes 5 may comprise two coplanar electrode plates, spaced from one another by a gap, so that a high frequency electronic field will extend between and forwardly of said plates, as indicated at $f$. A sample of material to be tested, such as the wood block indicated at $s$ in dotted lines, is placed in the field $f$ flat against the plates 5, so as to be penetrated by the field $f$. The oscillator delivers power from the plate circuit through coupled coils 14 and 15 to output circuit 16, and thence via electrodes 5 to the "load" constituted by the sample of material $s$. Power is absorbed by the sample $s$, to be dissipated in the form of heat, proportionately to its moisture content, and the power so drained from the oscillator is found to be a reliable indication of the moisture content of the sample. There are some other factors in some materials such as wood which have the capability of absorbing power from the circuit, but these in general are either constant in amount or tend to compensate one another, at least for many materials. Hence, the power drained from the oscillator becomes a reliable indication of the moisture content present in the sample.

It is the characteristic of the oscillator that the circulating direct current in the grid circuit, where the microammeter M is placed, falls materially with increasing power absorbed from the oscillator. Therefore, using a conventional microammeter, full scale deflection will correspond to low, minimum or zero moisture content, and the indicator hand will move progressively toward the left with increasing moisture content. In other words, the instrument will appear to read in the reverse direction from normal, as the zero or low end of the moisture percentage scale will be the right hand end thereof, which condition results from the fact that the electric current which the microammeter reads decreases with increasing percentage of moisture content. The instrument as thus described is known in the art, and with the exception of minor details, is disclosed in the aforementioned Patent Number 2,231,035.

With no material in the field $f$ between plates 5 other than air, the power absorption is at a minimum, and the indicating hand $i$ of meter M deflects its maximum at such time, as indicated by the position $a$ in Figure 2. The instrument may be adjusted to give this result by choice and adjustment of the values of the various fixed resistors previously described, the number of turns in the various coils, their spacing, and the setting of voltage divider 34. By adjustment of these factors, the range and sensitivity of the instrument may be materially varied. While adjustment of the individual network resistors produces effects which are not mutually exclusive, certain of the resistors may be regarded as having principal effects as follows: Increasing resistor 42 reduces the meter reading; increasing resistor 46 raises the meter reading at the low end of the scale; lowering resistor 44 increases the meter reading; resistor 47 controls amount of full scale deflection; increase in resistor 41 raises the meter reading; an increase in resistor 35 decreases plate current drain; and an increase in resistor L raises the meter reading. Further, the voltage divider 34 permits "zero" adjustment of the indicator hand of the meter prior to each use of the instrument, as will be again mentioned hereinafter.

Following the "air" adjustment to cause the meter hand to read to position $a$, a "bone-dry" sample of material, such as wood, may be placed in the field of the instrument. The dry wood will absorb some power, and the reading will be at some such a value as indicated at $d$, representing zero percentage of moisture for the material in question. When a sample of the same material containing moisture is then placed in the field of the instrument, the moisture present absorbs additional power, the grid current falls, and the meter hand moves further toward the left, as for example to the indicator position shown in full lines in Figure 2. The meter scale I is preferably divided into arbitrary scale divisions, running for example from 0 to 45 from right to left.

As already explained in part, it is usual to standardize each instrument as manufactured, to assure that correct readings will be given throughout the instrument scale. Using air as the first standard, adjustments of the resistors are first made until the indicator hand reads zero on the meter scale (position a). A second standard is then employed, which might be a bone dry sample of wood, and the resistors are again then adjusted until the indicator reads 10 on the scale I, coinciding with the previously established dry wood point d. Additional standards are then used, and these may be wood samples maintained under humidity control to have predetermined percentages of moisture content, or they may be material blocks having power loss characteristics matched to predetermined moisture percentages. By use of these, and adjustment of the network resistors, the meter hand can be made to read accurately throughout the full range of scale I.

As a result of battery aging and other variable conditions encountered in practice, the meter will frequently be found to depart from its "zero" reading on air. Readjustment is accomplished by the use of the voltage divider 34, which, assuming proper original adjustment of the instrument, may be utilized to bring the indicator hand of the meter back to the original "air zero" position a, whereupon the meter will again read correctly for the entire meter scale.

From a consideration of Figure 2 it will be seen that the maximum useful range of the instrument, from the dry wood point upwards, is compressed within the scale space from 10 to 45, rather than being spread over the whole scale from 0 to 45. It is the purpose of the present invention to spread the useful range over the entire instrument scale I. As an example, let it be assumed that the range of maximum interest is from 6% to 18% moisture. The problem is then to cause the instrument to read "0" on the 0-45 moisture scale when a 6% moisture sample is placed in the field of the instrument.

It will be useful at this time to look at a typical calibration curve for a given sample of material, as shown in Figure 3. The readings of the meter M are plotted as ordinates, and moisture percentage as abscissa. Numeral 70 designates a typical calibration curve as known previously, and it will be seen that this curve intercepts the meter scale at 10 (zero % moisture for the sample), and rises to a meter scale reading of 45 for 18% moisture. Again it will be seen that the useful working range, from 10 to 45, is undesirably compressed. With reference to Figure 3, the problem above stated becomes one of lowering the beginning end of the calibration curve to zero, or even lower, on the meter scale.

We accomplish this purpose by eliminating the "air standard" of prior practice, and substituting an electrical impedance standard having power loss characteristics equivalent to the power absorption characteristics of a sample of the material at the moisture content of beginning interest. This might be 0%, or 6%, or any other. The present example assumes 6%.

Referring again to Figure 1, oscillator output circuit 16 has in its two sides a double-pole, double-throw switch 80 by which coil 15 may be connected either directly across output electrode plates 5, or across resistor 81, the electrode plates being at such time out of circuit. This resistor may have a resistance of the order of 75,000 ohms. Resistor 81 is so chosen that its power loss characteristics are precisely the power loss characteristics of a sample of material of that moisture percentage at which it is desired that the calibration curve shall start. It will become clear that this moisture percentage might be zero, in which case resistor 81 is chosen to match the loss characteristics of a bone dry sample of wood placed against the electrode plates 5. In other words, resistor 81 should be so chosen that the meter M will give the same deflection with switch 80 connecting either the resistor 81 in circuit with the oscillator, or the electrode plates with the bone dry sample of wood in circuit with the oscillator. It was stated above, however, that the illustrative purpose was to move the calibration curve downwardly until the calibration curve started with 6% moisture content. Accordingly, for this illustrative purpose, it is necessary to choose a resistor 81 having loss characteristics corresponding with a sample of material of 6% moisture. A sample of material humidity-conditioned to have 6% moisture content is therefore used against the electrode plates 5, and a resistor 81 so chosen that the meter M will give the same reading with the switch 80 in either of its two positions. The sample of material is then laid aside, and with the meter connecting the resistor 81 in circuit with the oscillator, its resistance network is adjusted until the indicating hand of the meter reads zero with the selected resistor 81 in circuit, which may be readily accomplished by adjusting the values of the various resistance factors as mentioned hereinabove. By this procedure, it is possible to obtain a calibration curve such as indicated at 71, intercepting the moisture percentage scale at 6%, but being otherwise substantially parallel to the original curve 70. It will be seen that this curve may cover an extended range beyond 18%, for instance up to 24%. Thus an extended moisture percentage range is obtainable, which is one possible accomplishment of the invention.

It is usually more useful, however, to expand the original range, here assumed to be 16 to 18%, and this may be done by adjusting the resistor network not only to lower the 6% point into coincidence with 0 on the meter scale, but also to keep the 18% point in coincidence with meter scale division 45. If enough adjustment cannot be obtained by means of the resistor network, the number of turns in the output coil 15 can be adjusted, it being evident that the greater the number of turns in said coil, the greater will be the voltage across the output circuit, and the greater will be the field strength and sensitivity of the instrument. Thus by adjustment of these factors, a new curve 72 is obtainable, extending from 6% moisture at zero deflection on the meter scale to 18% moisture at the 45 division point on the meter scale. The moisture range of interest is thus spread out over the entire meter scale I, giving improved accuracy throughout the working range of the instrument.

It will be seen that the calibration curve has been lowered or depressed until its point of intercept with the meter scale axis is actually below the zero point of the meter scale. In other words, it is "off scale" of the meter.

As previously explained, it has been the practice to readjust this type of instrument prior to each use by means of the voltage divider to bring the indicator hand to a zero indication with the electrodes in contact with air. Under practice in accordance with the present invention, the instrument is "zeroed" prior to each use on the electrical resistor 81; and in the illustrative example, it is "zeroed" by causing the meter hand to read zero on scale I with a power drain on the instrument corresponding to 6% moisture content. The meter scale thus reads upwardly from 6% moisture content in the sample, rather than upwardly from a reading on air. It will be evident that the meter scale I might be calibrated directly in percentage of moisture content. It is usually desirable, however, to use the arbitrary scale I, and provide conversion charts showing the moisture percentage for each division of scale I.

A feature of the invention is the provision of a special form of double-pole double-throw switch 80 adapted to house the resistor 81 and seal it against outside moisture, as well as to protect against leakage currents between the two sides of the output circuit. This switch comprises an insulation disc 100, preferably polystyrene, whose two faces are partially received and are rotatable within cylindrical recesses 101a in two spaced insulation panels 101. The disc 100 has a pair of diametrically spaced contact pins 102 extending therethrough and presenting contact heads which are engageable, in one position of the disc, with spring contact arms 103 reaching inwardly through apertures 104 in panels 101. The contact arms are mounted on terminal posts carried by the panels 101, and those on the upper panel 101 may be regarded as connected to the output coil 15, while those on the lower panel may be connected to the output electrodes 5. In the position illustrated, the circuit is completed to the output electrodes via the spring arms and pins 102.

Disc 100 also has another pair of diametrically spaced contact pins 110 and 111, these being on a radius of the disc which may be at about 30° from that of the pins 102. The pins 110 and 111 extend only part way through the disc, and have connected thereto opposite ends of the resistor 81 which is sealed in a moisture proof condition inside a bore 112 in the disc. The sealing compound may be liquid polystyrene, and serves to insulate the resistor against humidity conditions of the atmosphere. By rotating the disc 100 until pins 110 and 111 make contact with the upper contact arms 103, as by means of handle 120, the resistor 81 is connected across the output coil 15. The switch as thus described provides a long leakage path between the two sides of the oscillator circuit, and has the further function of enclosing and sealing the resistor 81 entirely within itself.

We claim:
1. In a moisture testing instrument of the character described, a vacuum tube oscillator having an output circuit and having an indicating meter arranged to indicate the amount of power drawn from said output circuit, said indicating meter having an instrument scale with end limits and an indicator hand movable thereover, output electrodes having a gap therebetween for an electric field into which a sample of material may be placed, means in the circuit of said oscillator for adjusting the electrical state thereof to cause said indicating hand to register zero deflection on said scale for the power absorption from said oscillator resulting from placement of a standard sample of material of a predetermined sensible moisture percentage in the field of said output electrodes, an electrical resistor, and switch means for connecting said output circuit across either said output electrodes or said resistor, said resistor having power absorption characteristics equivalent to that of said sample of material of predetermined moisture content.

2. In a moisture testing instrument of the character described, a vacuum tube oscillator having an output circuit and having an indicating meter arranged to indicate the amount of power drawn from said output circuit, said indicating meter having an instrument scale with end limits and an indicator hand movable thereover, output electrodes having a gap therebetween for an electric field into which a sample of material may be placed, voltage adjustment means in the circuit of said oscillator for adjusting the electrical state thereof to cause said indicating hand to register zero deflection on said scale for the power absorption from said oscillator resulting from placement of a standard sample of material of a pretermined sensible moisture percentage in the field of said output electrodes, an electrical resistor, and switch means for connecting said output circuit across either said output electrodes or said resistor, said resistor having power absorption characteristics equivalent to that of said sample of material of predetermined moisture content.

MARVIN L. McBRAYER.
AUGUST JOHN SWYKE.

REFERENCES CITED

The following references are of record in the file of this patent:

UNITED STATES PATENTS

| Number | Name | Date |
|---|---|---|
| 1,826,247 | Heppenstall | Oct. 6, 1931 |
| 2,068,499 | Mackenzie | Jan. 19, 1937 |
| 2,150,015 | Witham | Mar. 7, 1939 |
| 2,183,333 | Hart | Dec. 12, 1939 |
| 2,343,340 | Stevens | Mar. 7, 1940 |
| 2,427,239 | Taylor | Sept. 9, 1947 |